United States Patent Office 3,078,233

Patented Feb. 19, 1963

3,078,233

METHOD OF DOPING CRYSTALS

Stephen Martin, Culver City, Calif., assignor to Pacific Semiconductors, Inc., Culver City, Calif., a corporation of Delaware No Drawing. Filed Nov. 14, 1960, Ser. No. 68,584
11 Claims. (Cl. 252—62.3)

This invention relates to the production of semiconductor crystals and more particularly to an improved method for producing doped crystals of a predetermined conductivity.

It is known to control the conductivity type of semiconductor materials such as silicon and germanium by introducing a small quantity of an active impurity or dopant.

The term active impurity is used to denote those impurities which affect the electrical characteristics of semiconductor materials as distinguished from other impurities which have no appreciable effect upon these characteristics. Active impurities are ordinarily classified as donor impurities and acceptor impurities, rendering the material N-type or P-type, respectively. Donor impurities include phosphorus, arsenic, antimony and bismuth while included among acceptor impurities are boron, aluminum, gallium and indium.

The most common prior art technique for doping semiconductor crystals is to add a master alloy consisting of a predetermined quantity of a dopant and the semiconductor material itself to the melt.

Another prior art technique which is especially useful for doping semiconductor crystals of low resistivity is to directly add the doping element to the melt. The most usually used semiconductor material, silicon, has a melting point of 1420° C. Heretofore, because of the relatively high volatility of phosphorus at or near this high temperature, the distribution of the phosphorus within the crystal as it was withdrawn from the melt has not, as a rule, been uniform or predictable.

Furthermore, for certain types of semiconductor devices such as Zener diodes and tunnel diodes it is often required to provide crystal bodies of N-type conductivity whose resistivity is extremely low and in which the limits are closely maintained.

An additional shortcoming inherent in the use of elemental phosphorus lies in its poisonous nature. That is, phosphorous has a tendency to contaminate the crystal puller apparatus, and is a hazardous chemical with respect to the health of the operator.

The present invention method overcomes all of the disadvantages of the prior art method while providing a relatively simple and reliable method for achieving the desired effect of producing a crystal having an accurate low and predetermined resistivity.

It is therefore a primary object of the present invention to provide an improved method for producing a uniformly doped semiconductor crystal.

Another object of the present invention is to provide an improved method for producing semiconductor crystals such as silicon containing an active impurity and having prescribed electrical characteristics.

A further object of this invention is to provide a method of producing a grown crystal of semiconductor material including an impurity, having uniform electrical characteristics.

A still further object of the present invention is to provide an improved method for producing a single silicon crystal uniformly doped with phosphorus.

The novel features which are believed to be characteristic of the present invention, together with further objects and advantages thereof, will be better understood from the following description in which the invention is illustrated by way of example. It is to be expressly understood, however, that this description is for the purpose of illustration only, and that the true spirit and scope of the invention is defined by the accompanying claims.

In accordance with the presently preferred embodiment of this invention, a predetermined quantity of tribasic calcium orthophosphate ($Ca_3(PO_4)_2$) is added to a molten mass of silicon, for example, and a single seed crystal is used to grow a single phosphorus doped crystal in a manner otherwise in accordance with prior art practice.

While the present invention will be described with reference to silicon as the semiconductor material, such is by way of example only. It is also applicable to other semiconductor materials such as germanium and germanium-silicon alloys.

In a typical run whereby a single low resistivity N type silicon crystal is grown the following procedure is followed.

200 grams of raw semiconductor grade silicon is placed into the crucible of a silicon crystal growing furnace of a type well known to the art. To the silicon is added 230 mg. of dry tribasic calcium orthophosphate, $Ca_3(PO_4)_2$. The crucible is placed within the crystal puller and a helium atmosphere is established. The crucible is then heated to the melting point of silicon, i.e., 1420° C. A single seed crystal of silicon is lowered into the melt and then withdrawn to thus pull a longer single crystal ⅞ inch in diameter, approximately 8 inches long. The resistivity of the crystal thus grown will lie in the range from 0.007 to 0.010 ohm-cm.

In addition to tribasic calcium orthophosphate, other calcium-phosphorus compounds may be used in accordance with the present invention method. The present invention resides to a considerable extent in the discovery that certain compounds including an active impurity may be used to dope semiconductor crystals resulting in extremely uniform and predictable resistivities. What is required is a compound resulting in a system between the molten semiconductor material and the compound in which the volatility is low. In addition, the compound itself should have a low volatility around the melting point of the semiconductor material. By the term "low volatility" is meant that the volatility be low compared to that of elemental phosphorus or which is in the form of its most simple oxide, i.e., $P_2O_5$. $P_2O_5$ has a volatility of approximately 1600 atmospheres at around the melting point of silicon and pure phosphorus has a volatility of approximately 3400 atmospheres at around the melting point of silicon. The volatility of the compound used in accordance with the present invention should be at least of the order of from 100–1000 times less than that of $P_2O_5$ and preferably below 1 atmosphere. It should also have a relatively high melting point, i.e., not lower than approximately 975° C. The melting point of tribasic calcium orthophosphate is 1730° C. A particularly satisfactory group of compounds which is particularly suited to the present invention method are various combinations of CaO and $P_2O_5$.

Examples of other suitable compounds which may thus be employed within the concept of the present invention include: calcium pyrophosphate, $Ca_2P_2O_7$ which has a melting point of 1230° C.; calcium metaphosphate $Ca(PO_3)_2$ which has a melting point of 975° C.

The range of resistivity which may be obtained by the use of these various calcium phosphorus compounds above indicated for a silicon crystal grown in accordance with the present invention method lies in the range of from 0.002 to 1 ohm centimeter.

While the present invention method is particularly suited for the production of grown single crystals, it may also be employed for producing doped crystals prepared by other known methods including zone leveling and zone melting.

A limitation upon the class of compounds which may be used in accordance with present invention method is that there not be included any element which will deleteriously affect the crystal's electrical characteristics.

There has thus been described a new and improved method for producing accurately controlled doping of semiconductor crystals such as silicon in which the resistivity level and resistivity distribution may be accurately controlled over very narrow limits.

What is claimed is:

1. In the production of a semiconductor crystal body selected from the group consisting of silicon, germanium and silicon-germanium alloys of a predetermined conductivity type, the method of introducing a controlled amount of an active impurity into a crystal of semiconductor material including the step of adding to a molten mass of said semiconductor material a calcium phosphate compound having a melting point not lower than 975° C. and a volatility not in excess of 16 atmospheres at the melting point of said semiconductor material.

2. In the production of a semiconductor crystal body selected from the group consisting of silicon, germanium and silicon-germanium alloys of a predetermined conductivity type, the method of introducing a controlled amount of an active impurity into a crystal of semiconductor material including the step of adding to a molten mass of said semiconductor material a compound, said compound being selected from the group consisting of tribasic calcium orthophosphate, calcium pyrophosphate, and calcium methaphosphate.

3. In the production of a semiconductor crystal of silicon of N–type conductivity, the method of introducing a controlled amount of phosphorus into crystal of silicon including the step of adding to a molten mass of silicon a calcium phosphate compound having a melting point not lower than about 975° C. and a volatility not in excess of one atmosphere at the melting point of silicon.

4. In the production of a semiconductor crystal of silicon of N-type conductivity, the method of introducing a controlled amount of phosphorus into a crystal of silicon including the step of adding to a molten mass of silicon a predetermined quantity of tribasic calcium orthophosphate.

5. The method of producing a single crystal of semiconductor material of N-type conductivity having a predictable and uniform resistivity, said method including the steps of: melting said semiconductor material; adding to said molten semiconductor material a predetermined quantity of a calcium phosphate compound having a melting point not lower than about 975° C. and a volatility not in excess of one atmosphere at the melting point of said semiconductor material; progressively solidifying the semiconductor material from the molten state on a seed crystal; and concurrently pulling the crystal with the solidified semiconductor material together with phosphorus from said compound to thereby produce a single crystal of said semiconductor material with a uniform distribution of phosphorus therein.

6. The method of producing a single crystal of semiconductor material of N-type conductivity having a predictable and uniform resistivity, said method including the steps of: melting said semiconductor material; adding to said molten semiconductor material a predetermined quantity of tribasic calcium orthophosphate; progressively solidifying the semiconductor material from the molten state on a seed crystal; and concurrently pulling the crystal with the solidified semiconductor material together with phosphorus from said tribasic calcium orthophosphate to thereby produce a single crystal of said semiconductor material with a uniform distribution of phosphorus therein.

7. The method of producing a single crystal of silicon material of N-type conductivity having a predictable and uniform resistivity, said method including the steps of: melting said silicon material; adding to said molten silicon material a predetermined quantity of tribasic calcium orthophosphate; progressively solidifying the silicon material from the molten state on a single seed crystal with the solidified silicon material together with phosphorus from said tribasic calcium orthophosphate to thereby produce a single crystal of said silicon material with a uniform distribution of phosphorous therein.

8. In the process of growing a doped semiconductor body selected from the group consisting of silicon, germanium and silicon-germanium alloys by crystallization from a molten bath of said semiconductor, the step of adding to said bath a calcium polyphosphate having a melting point in excess of 950° C. and evidencing a low volatility at the melting point of the semiconductor material in sufficient amounts to achieve a predetermined phosphorus content in the resulting semiconductor crystal.

9. In the production of a semiconductor crystal of silicon of N-type conductivity, the method of introducing a controlled amount of phosphorus into a crystal of silicon including the step of adding to a molten mass of silicon a predetermined quantity of calcium pyrophosphate.

10. In the production of a semiconductor crystal of silicon of N-type conductivity, the method of introducing a controlled amount of phosphorus into a crystal of silicon including the step of adding to a molten mass of silicon a predetermined quantity of calcium metaphosphate.

11. In the production of a semiconductor crystal of silicon of N-type conductivity, the method of introducing a controlled amount of phosphorus into a crystal of silicon including the step of adding to a molten mass of silicon a predetermined quantity of tribasic calcium orthophosphate in the ratio of about 115 milligrams of tribasic orthophosphate per 100 grams of silicon.

References Cited in the file of this patent

UNITED STATES PATENTS 2,804,405 Derick et al. ............ Aug. 27, 1957
2,841,599 Rosi .................... July 1, 1958

OTHER REFERENCES

Semi-Conductors, Hannay, Reinhold, 1950, p. 135.